March 8, 1955 A. T. DOUGLAS 2,703,835

ARC WELDING APPARATUS AND METHOD

Filed Nov. 21, 1952

INVENTOR.
Albert T. Douglas
BY Thos. E. Scofield
ATTORNEY.

United States Patent Office 2,703,835
Patented Mar. 8, 1955

2,703,835

ARC WELDING APPARATUS AND METHOD

Albert T. Douglas, Kansas City, Mo.

Application November 21, 1952, Serial No. 321,834

8 Claims. (Cl. 219—10)

The present invention relates in general to electric or arc welding, and it deals more particularly with an improved method and means for properly locating the position of welds by which relatively large sheet metal panels are secured to other metal members.

It often is desirable to "tack" a sheet metal panel at spaced intervals to supporting frame members or the like by means of spot welds, but because of the thinness of the sheet material and the tendency of welding to crystallize the metal at and adjoining the site of each weld, difficulty is usually encountered by reason of weakening and/or burning through the sheet metal unless special precautions are taken to insure security and permanence of the bond. One of the simplest ways of dealing with this problem is to place one face of the sheet metal against the support to which it is to be welded and place a small metal lug or washer against the opposite face at the point where the weld is to be located; then the three can be welded together at that point, the weld serving to secure the washer to the support through the sheet—and with the sheet metal sandwiched therebetween—so that stress upon the sheet is distributed and it cannot tear loose from the support as it could without the auxiliary fastening lug or washer.

However, in following this practice with arc welding equipment, another serious difficulty is encountered. After positioning a lug or washer as desired on the surface of the sheet metal, the welder must, before beginning the welding operation proper, lower his mask or hood in order to protect his eyes against the rays which will be emitted from the arc, and when this has been done, the dark glass of the mask makes it impossible for him to see the washer any longer. Faced with this circumstance, it should be obvious that he rarely is able to bring the tip of the welding electrode immediately into such proper engagement with the washer that striking of the arc takes place at exactly the corect location; instead his first attempt ordinarily results in striking of the arc at some place removed from the washer and while the light generated by the arc may assist him in properly readjusting the position of the electrode, the damage already is done—thus, in the vast majority of cases, before the weld is successfully completed, there are one or more places in the general proximity of the weld where the sheet metal has been burned through by the welder's preliminary attempts to locate the washer he cannot see.

It is an object of the present invention, generally speaking, to overcome the foregoing difficulties. More specifically, it is my aim to provide a method and means whereby the welder can easily and quickly perform the requisite welding operation without any difficulty in determining the location of the weld and without any risk of injury to the sheet metal through miscalculation resulting from his inability to see the position where the arc should be struck prior to the actual establishment of the arc.

Another object is to provide a simple device and method for preventing an arc from being struck in any place except the correct one, said device being very economical to make, durable, easy to use and virtually foolproof.

Other and further objects of the invention, together with the features of novelty whereby the objects are achieved, will appear in the course of the following description.

In the accompanying drawings which form a part of the specification and are to be read in conjunction therewith, and in which like reference numerals are employed to indicate like parts of the various views.

Figure 1:
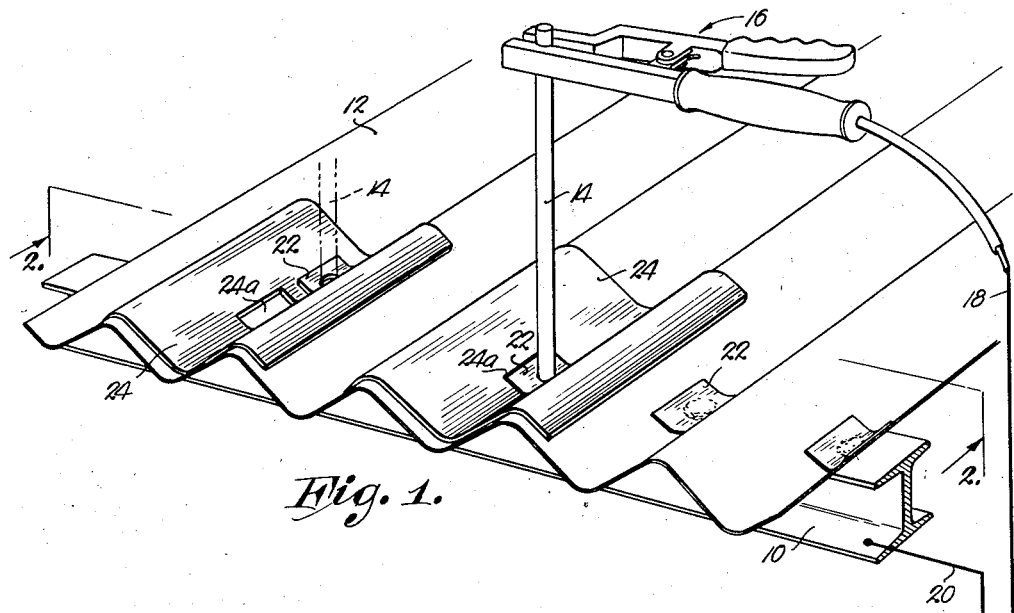
Fig. 1 is a perspective view illustrating one form of device made according to the invention and the method of using same.

Referring more particularly to Fig. 1, the numeral 10 indicates one of a series of parallel I-beams supporting the corrugated metal building 12. In building construction such an arrangement as this is conventional where, for example, the sheet metal is to serve as a form for receiving concrete to provide a floor or roof slab carried by the beams. As will be clear from the drawing, the corrugations in sheet 12 run crosswise of the beams so that only the bottoms of the trough portions of successive corrugations rest on the beam where they intersect. It is at these intersections then that it is desirable to anchor the sheeting to the beam by welding.

To carry this out with conventional arc welding apparatus, a welding rod electrode 14 carried by an insulated hand holder 16 is connected by a flexible cable or conductor 18 to one terminal of the electrical generator or other source of welding potential, while the opposite terminal of the source can be connected to the steel beam 10 by a second conductor 20 thereby to establish the necessary potential difference between the two.

Disregarding for the moment the problem presented by the necessity of shielding the welder's eyes from the rays of the arc, it can be seen that after a suitable curved washer or lug such as 22 has been positioned in any corrugation so that it overlies the beam, the welding can be carried out simply by introducing the tip of the electrode into the central opening of the washer to engage the sheet metal and/or the edge of the opening; an arc thereupon will be established at the tip of the electrode, its temperature being sufficient to produce fusion of the metal of the electrode, the washer, the sheet and the beam in the local area of the arc thereby to join the latter parts, whereupon the electrode is withdrawn and the arc consequently extinguished. Conveniently, the central opening in the washer can be completely or partially filled with the weld metal.

However, as previously suggested, the difficulty of carrying out this operation resides in the fact that before initially striking the arc, it is important for the welder's eyes to be protected by the dark glass of his mask or hood, and when they are thus covered, he is unable to see the washer at all, much less the central opening in which he desires to insert the electrode. If he attempts to insert the electrode by guess, he will in the majority of instances not only miss the central opening but miss the washer altogether and strike an arc outside the latter, which quickly burns through the thin metal of sheet 12.

To deal with this problem, I provide a template or guide 24 formed of electrical insulating material which is capable of withstanding the temperatures encountered in welding, which in this case are of the order of 1500° F. The template preferably is in the form of a corrugated panel whose corrugations match and will nest in those of the metal sheeting 12, but strictly speaking it is not absolutely essential that it seat on the crests of the corrugated sheeting so long as it is shaped to conform to the trough portion between two of said crests. In the latter region, the template contains a central opening 24a of such size and shape as to loosely receive one of the washers 22.

In using my template, it is preliminarily positioned as shown in the left-hand portion of Fig. 1, that is to say, with the opening 24a located directly over the beam 10. One of the washers 22 then is laid in the trough-shaped portion of the template at a point offset from the opening. Next, the welder (whose mask is raised so that he can see) inserts the tip of the electrode 14 in the central opening of the washer as indicated by dot-and-dash lines. This, it will be understood, does not result in the striking of an arc because the electrode and washer are insulated from the sheeting 12 by the template, and consequently his eyes cannot be harmed.

The welder now lowers his hood or mask to protect his eyes and, having done so, moves the electrode 14 laterally toward opening 24a while allowing its tip to ride on the template to keep the washer impaled upon the electrode. If desired, the template may be of a color which stands out in strong contrast to the color of the sheeting 12, in which case the opening 24a serves as a target having moderate visibility even through the dark glass of the welder's mask. However, this is not essential because even if he cannot see the opening 24a clearly, the trough-shaped upper surface of the template acts somewhat as a guide for the sidewise movement of the captive washer, and as a practical matter, no difficulty is experienced in bringing the washer into register with opening 24a. At that point, the washer and electrode drop into the opening as illustrated by solid lines in the middle portion of Fig. 1.

This completes the electrical circuit, establishing the arc, and the welding of the washer and sheeting to the beam can be completed in the usual fashion, after which the template is simply lifted from the sheet 12 leaving the welded-on washer in place as indicated in the right-hand portion of Fig. 1. The template, it will be seen, prevents the arc from being struck at any place except the correct one, and it also is useful in steadying the washer during the welding operation itself. It can be transferred quickly from place to place along the axis of beam 10 and in each position, is used by the welder in the same fashion as has been described so that the successive welds are completed speedily and without any possibility whatever of injury to the sheet metal due to striking of arcs in the wrong locations.

Figure 3:
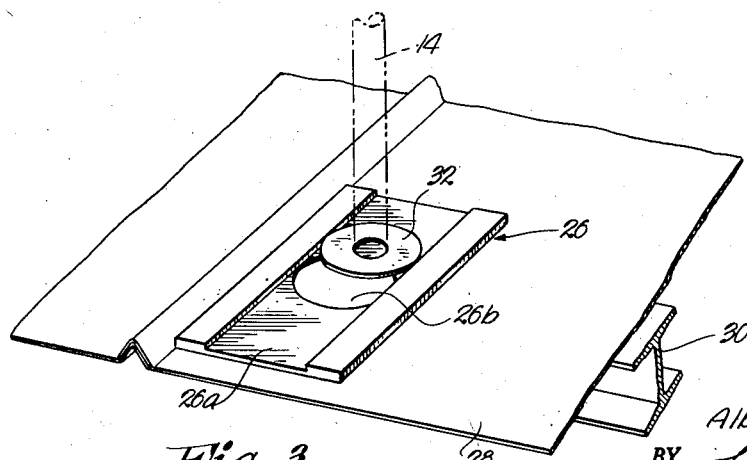
Fig. 3 is a perspective view illustrating another form of the invention.

Fig. 3 illustrates a modified form of insulator-template 26 suitable for use in welding essentially flat sheet panels 28 to a beam 30, to serve, for example, as a roof deck. Here, it is convenient to utilize a circular welding washer 32. The template in this instance has a flat undersurface adapted to seat on the sheeting 28 and in its upper surface there is a longitudinal channel or guideway 26a whose width is only enough greater than the diameter of the washer to permit the latter to move freely in the channel. Opening through the bottom of the channel there is a circular aperture 26b of such size as will permit the washer to pass therethrough easily.

The manner of using this template is basically the same as already has been described. That is to say, it is positioned so that the opening 26b is located at the place desired for the weld; washer 32 is laid in the channel at a point offset from the opening; the welding electrode 14 is introduced into the hole of the washer and used to advance the latter along the channel to the opening 26b where the arc is established and the weld completed.

Figure 2:
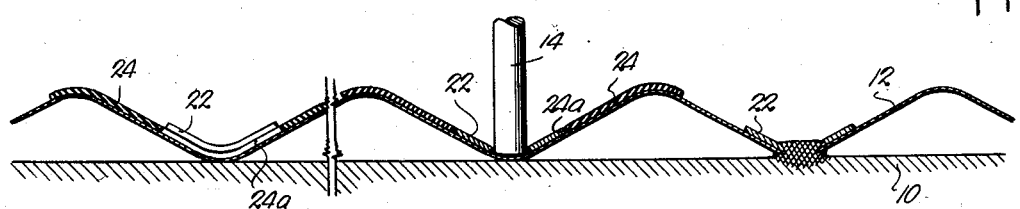
Fig. 2 is a cross-sectional view taken along the line 2—2 of Fig. 1 in the direction of the arrows.

Thus it will be seen that the salient novelty of my invention resides in covering all or at least substantially part of the area surrounding and adjacent the desired site of the weld with an insulator in order to prevent the striking of an arc in the covered area, and utilizing this to bring the necessary metal elements together in welding relationship only at the precise location desired. More particularly, I employ an insulator-template whose undersurface is shaped to seat on one of the members to be welded, in the region surrounding the weld site, and whose upper surface contains a guideway or channel to assist in guiding the welding lug or washer to the opening which determines the weld site. In the construction shown in Figs. 1 and 2, the upper contour of the template itself forms this guideway, but if desired, a pair of auxiliary longitudinal ribs may be provided on the upper surface running along opposite sides of the opening 24a to function in the same fashion as the longitudinal edges of channel 26a in Fig. 3.

From the foregoing it will be seen that this invention is one well adapted to attain all of the ends and objects hereinbefore set forth, together with other advantages which are obvious and which are inherent to the invention.

It will be understood that certain features and subcombinations are of utility and may be employed without reference to other features and subcombinations. This is contemplated by and is within the scope of the appended claims.

Inasmuch as many possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. The method of welding a metal washer to a generally horizontal surface of a metal body at a particular point on said surface, comprising the steps of establishing a potential difference between said body and a welding electrode, positioning an insulating panel against said body so it covers a portion of said generally horizontal surface thereof immediately adjacent to said point but leaves the surface of the body exposed at said point, positioning the washer on said insulator, holding said electrode upright and inserting the lower end thereof in the opening of said washer so the end of the electrode bears against said insulating panel, shifting said electrode laterally toward said particular point while maintaining the end of the electrode substantially against said insulating panel thereby to cause the washer to slide along said panel, and causing the electrode and washer to move into engagement with the surface of the body when they reach said point.

2. The method of welding a metal washer to the surface of a metal body at a particular point on said surface, comprising the steps of establishing a potential difference between said body and a welding electrode, covering a portion of the surface of the body immediately adjacent to said particular point with an insulator while leaving the surface at said point uncovered, impaling said washer loosely on said electrode and pressing the tip of the electrode against the insulator to retain the washer on the electrode, moving the electrode laterally toward said particular point while maintaining its tip pressed against the insulator whereby an arc is established when the electrode moves past the covered portion of said surface and into contact with the uncovered surface at said point, and moving the washer into engagement with the uncovered surface at said point substantially simultaneously with the striking of said arc.

3. The method of arc welding a metal washer to the surface of a metallic body at a particular point on said surface and at the same time protecting adjoining portions of said surface from injury due to accidental arcs, comprising the steps of establishing a potential difference between said body and a welding electrode, covering a substantial portion of the surface of said body surrounding said point with a non-metallic insulator but leaving the surface at said point exposed, whereby only the exposed surface at said point is accessible to said electrode for the striking of an arc, positioning the washer in engagement with the exposed surface at said point, and engaging the electrode with the exposed metal within said covered area, thereby to strike an arc.

4. The method of welding a metal washer to the surface of a metal body at a particular point on said surface, comprising the steps of establishing a potential difference between said body and a welding electrode, then bringing said electrode and washer into contact with one another at a point laterally offset from said particular point, shifting them together laterally toward said particular point, maintaining them insulated from said body until they reach said particular point and there bringing them into contact with the surface of the body to establish a welding arc.

5. The method of welding a metal washer to the surface of a metal body at a particular point on said surface, comprising the steps of establishing a potential difference between said body and a welding electrode, positioning the end of said electrode close to the surface of said body at a point offset from said particular point, shifting the electrode laterally toward said particular point, maintaining the electrode insulated from the body until it reaches said particular point and there bringing it into contact with the body to establish a welding arc, and maintaining said washer in contact with said body at said point while said arc is maintained thereby to weld same to the body.

6. In a device for facilitating arc-welding of a metal washer to the surface of a metal body at a particular point on the latter, a panel of insulating material having an undersurface adapted to seat on said surface of the body and an upper surface containing a longitudinal channel for receiving the washer, said channel having at a particular point along its length an opening through which the washer can pass to engage the surface of the body against which the undersurface of the panel is seated.

7. A device as in claim 6 wherein said panel is formed of electrical insulating material capable of withstanding temperatures of the order of 1500° F.

8. In a template for facilitating arc-welding of a metal washer to the upper surface of a generally horizontal corrugated metal sheet at a particular point thereon, a corrugated sheet of electrical insulating material containing corrugations complementary to those of said metal sheet so that when positioned to overlie the latter, the corrugations of the two sheets will mesh and the undersurface of the insulating sheet will seat on the upper surface of the metal sheet, the upper surface of the insulating sheet then forming at least one trough adapted to receive said washer, said insulating sheet containing an opening through the bottom of said trough at a particular point along its length, and said opening being of a shape and size conforming to that of said washer to permit the washer to pass therethrough into contact with the metal sheet upon being advanced along the trough to said opening.

References Cited in the file of this patent

UNITED STATES PATENTS

| | | |
|---|---|---|
| 1,363,933 | Trimble | Dec. 28, 1920 |
| 1,807,971 | Day | June 2, 1931 |
| 2,102,455 | Bonsall | Dec. 14, 1937 |
| 2,268,520 | Wesley | Dec. 30, 1941 |
| 2,477,894 | Pityo et al. | Aug. 2, 1949 |